(12) United States Patent
Hamada et al.

(10) Patent No.: US 12,061,335 B2
(45) Date of Patent: Aug. 13, 2024

(54) VEHICULAR HEAD-UP DISPLAY AND LIGHT SOURCE UNIT USED THEREFOR

(71) Applicant: KOITO MANUFACTURING CO., LTD., Tokyo (JP)

(72) Inventors: Kento Hamada, Shizuoka (JP); Takanobu Toyoshima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 387 days.

(21) Appl. No.: 17/603,736

(22) PCT Filed: Apr. 13, 2020

(86) PCT No.: PCT/JP2020/016340
§ 371 (c)(1),
(2) Date: Oct. 14, 2021

(87) PCT Pub. No.: WO2020/218072
PCT Pub. Date: Oct. 29, 2020

(65) Prior Publication Data
US 2022/0197025 A1 Jun. 23, 2022

(30) Foreign Application Priority Data
Apr. 22, 2019 (JP) .................. 2019-080996

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/0231* (2013.01); *G02B 5/045* (2013.01); *B60K 35/23* (2024.01)

(58) Field of Classification Search
CPC .. G02B 27/0101; G02B 5/0231; G02B 5/045; B60K 35/00; B60K 2370/1529
(Continued)

(56) References Cited

U.S. PATENT DOCUMENTS

| 6,547,400 B1 | 4/2003 | Yokoyama |
| 2003/0147055 A1 | 8/2003 | Yokoyama |

(Continued)

FOREIGN PATENT DOCUMENTS

| EP | 3165952 A1 | 5/2017 |
| JP | 2000-112031 A | 4/2000 |

(Continued)

OTHER PUBLICATIONS

Intellectual Search Report (PCT/ISA/210) issued Jul. 7, 2020 by the International Searching Authority in counterpart International Patent Application No. PCT/JP2020/016340.
(Continued)

*Primary Examiner* — William Choi
(74) *Attorney, Agent, or Firm* — Sughrue Mion, PLLC

(57) ABSTRACT

A light source unit used for a vehicular head-up display includes a prism-shaped multi-reflection member and a substrate. The multi-reflection member has: an entrance surface; an emission surface; and a reflective surface connecting the entrance surface and the emission surface. The substrate faces the entrance surface and is provided with a plurality of light sources mounted in a matrix. A ratio Ra=A/B or a ratio Rc=a/b is larger than a ratio Rb=C/D, where A and B is the number of the light sources provided in a longer and shorter direction of the entrance surface, respectively, C and D is a longer and shorter dimension of the emission surface, respectively, and a and b is the sum of lengths of light-emitting surfaces of the plurality of light sources in the longer and shorter direction of the entrance surface, respectively.

3 Claims, 6 Drawing Sheets

(51) Int. Cl.
    *G02B 5/02*     (2006.01)
    *G02B 5/04*     (2006.01)
    *B60K 35/23*     (2024.01)

(58) Field of Classification Search
    USPC .......................................................... 359/630
    See application file for complete search history.

(56) References Cited

U.S. PATENT DOCUMENTS

| | | |
|---|---|---|
| 2007/0024971 A1 | 2/2007 | Cassarly et al. |
| 2016/0299341 A1* | 10/2016 | Yoshida ................ G02F 1/1339 |
| 2017/0052436 A1 | 2/2017 | Xian |
| 2019/0196187 A1 | 6/2019 | Kasazumi et al. |

FOREIGN PATENT DOCUMENTS

| | | |
|---|---|---|
| JP | 2011-85834 A | 4/2011 |
| JP | 2018-45103 A | 3/2018 |
| JP | 2018-114939 A | 7/2018 |

OTHER PUBLICATIONS

Witten Opinion (PCT/ISA/237) issued Jul. 7, 2020 by the International Searching Authority in counterpart International Patent Application No. PCT/JP2020/016340.
Extended European Search Report issued May 13, 2022 by the European Patent Office in counterpart European Patent Application No. 20793959.6.

* cited by examiner

VEHICULAR HEAD-UP DISPLAY AND LIGHT SOURCE UNIT USED THEREFOR

TECHNICAL FIELD

The present disclosure relates to a vehicular head-up display and a light source unit used therefor.

BACKGROUND ART

Patent Literature 1 discloses a head-up display including an optical system for displaying a three-dimensional virtual image using a transparent display medium. This head-up display projects light on a windshield within driver's sight. Some of projected light transmits through the windshield, while some of the rest is reflected by the windshield toward the driver's eyes. The driver perceives the reflected light entering the eyes as a virtual image that appears to be an image of an object on the opposite side (outside the vehicle) across the windshield with a real object visible through the windshield a background.

CITATION LIST

Patent Literature

Patent Literature 1: JP2018-45103A

SUMMARY OF INVENTION

Technical Problem

A HUD is disclosed in Patent Literature 1. In a HUD, light is emitted onto a liquid crystal element, and an image formed by the light is projected onto a windshield or a combiner. A light source unit configured to emit light onto the liquid crystal element is expected to emit light having a uniform luminance distribution.

An object of the present invention is to provide a light source unit that can emit light having a more uniform luminance distribution and to provide a head-up display using that light source unit.

Solution to Problem

To achieve the above object, a light source unit according an aspect of the present invention is a light source unit used for a vehicular head-up display configured to display a predetermined image to an occupant of the vehicle including:
  a prism-shaped multi-reflection member that has:
    an entrance surface;
    an emission surface; and
    a reflective surface that connects the entrance surface and the emission surface on an inner surface of the multi-reflection member; and
  a substrate that faces the entrance surface and is provided with a plurality of light sources mounted in a matrix, in which
  a ratio $Ra=A/B$ is larger than a ratio $Rb=C/D$, where A is the number of the light sources provided in a longer direction of the entrance surface, B is the number of the light sources provided in a shorter direction of entrance surface, C is a longer dimension of the emission surface, and D is a shorter dimension of the emission surface, or a ratio $Rc=a/b$ is larger than a ratio $Rb=C/D$, where a is the sum of lengths of light-emitting surfaces of the plurality of light sources in the longer direction of the entrance surface, b is the sum of lengths of the light-emitting surfaces of the plurality of light sources in the shorter direction of the entrance surface, C is the longer dimension of the emission surface, and D is the shorter dimension of the emission surface.

To achieve the above object, a vehicular head up-display according to another aspect of the present invention is a head-up display that is provided in a vehicle and is configured to display a predetermined image to an occupant of the vehicle including:
  a picture generation section including:
    a picture generation unit that is configured to emit light for generating the predetermined image; and
    a reflection unit that reflects light so that light emitted by the picture generation unit heads toward a windshield, in which
  the picture generation unit further includes:
    a liquid crystal element; and
    the light source unit described above.

Advantageous Effects of Invention

According to the present invention, there are provided a light source unit that can emit light having a more uniform luminance distribution and a head-up display using that light source unit.

DESCRIPTION OF EMBODIMENTS

Figure 1:
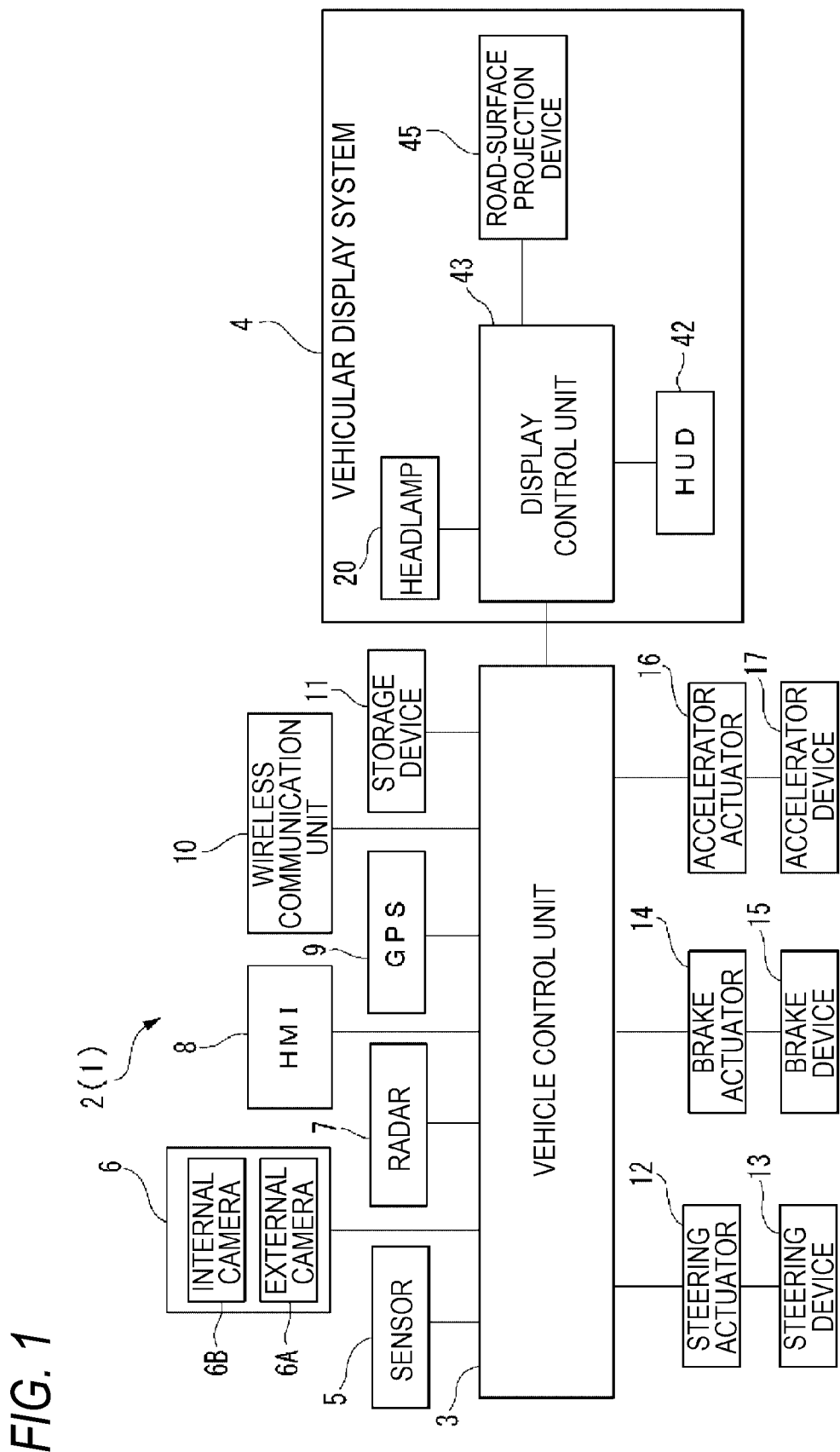
FIG. 1 is a block diagram of a vehicular system including a vehicular display system.

Hereinafter, an embodiment of the present invention (hereinafter, referred to as the present embodiment) will be described with reference to the drawings. Dimensions of members shown in the drawings may be different from actual dimensions of the members for the sake of convenience of description.

In the description of the present embodiment, for convenience of description, a "left-right direction," an "upper-lower direction," and a "front-rear direction" may be referred to, as appropriate. These directions are relative directions set for a head-up display (HUD) 42 shown in FIG. 2. The "left-right direction" includes a "leftward direction" and a "rightward direction." The "upper-lower direction" includes an "upward direction" and a "downward direction." The "front-rear direction" includes a "frontward direction" and a "rearward direction." Although not shown in FIG. 2, the left-right direction is orthogonal to the upper-lower direction and the front-rear direction.

First, a vehicular system 2 according to the present embodiment will be described below with reference to FIG. 1. FIG. 1 is a block diagram of the vehicular system 2. A vehicle 1 on which the vehicular system 2 is mounted is a vehicle (automobile) that can travel in self-driving mode.

As shown in FIG. 1, the vehicular system 2 includes: a vehicle control unit 3; a vehicular display system 4 (hereinafter, simply referred to as a "display system 4"); a sensor 5; a camera 6; and a radar 7. The vehicular system 2 further includes: a human machine interface (HMI) 8; a global positioning system (GPS) 9; a wireless communication unit 10; a storage device 11; a steering actuator 12; a steering device 13; a brake actuator 14; a brake device 15; an accelerator actuator 16; and an accelerator device 17.

The vehicle control unit 3 is configured to control traveling of the vehicle. The vehicle control unit 3 is configured with, for example, at least one electronic control unit (ECU). The electronic control unit includes: a computer system (for example, a system on a chip (SoC)) including one or more processors and one or more memories; and an electronic circuit including an active element such as a transistor and a passive element. The processor includes, for example, at least one of a central processing unit (CPU), a micro processing unit (MPU), a graphics processing unit (GPU), and a tensor processing unit (TPU). The CPU may include a plurality of CPU cores. The GPU may include a plurality of GPU cores. The memory includes a read-only memory (ROM) and a random-access memory (RAM). The ROM may store a vehicle control program. For example, the vehicle control program may include an artificial intelligence (AI) program for self-driving. The AI program is a program (trained model) constructed by supervised or unsupervised machine learning (in particular, deep learning) in a multi-layer neural network. The RAM may temporarily store a vehicle control program, vehicle control data, and/or surrounding information relating to surroundings of the vehicle. The processor may be configured to load a designated program from various vehicle control programs stored in the ROM onto the RAM to execute various types of processing in cooperation with the RAM. The computer system may be configured with a non-von Neumann computer such as an application specific integrated circuit (ASIC) and a field-programmable gate array (FPGA). The computer system may be configured with a combination of a von Neumann computer and a non-von Neumann computer.

The display system 4 includes: a headlamp 20; a road-surface projection device 45; the HUD 42; and a display control unit 43.

The head lamp 20 is disposed on each of a left side and a right side of a front surface of the vehicle and includes: a low-beam lamp configured to illuminate an area ahead of the vehicle with a low beam; and a high-beam lamp configured to illuminate an area ahead of the vehicle 1 with a high beam. Each of the low-beam lamp and the high-beam lamp includes: one or more light-emitting elements such as a light-emitting diode (LED) and a laser diode (LD); and an optical member such as a lens and a reflector.

The road-surface projection device 45 is disposed in a lamp housing of the headlamp 20. The road-surface projection device 45 is configured to emit a light pattern toward a road surface outside the vehicle. The road surface drawing device 45 includes: a light source unit; a driven mirror; an optical system such as a lens and a mirror; a light-source drive circuit; and a mirror drive circuit. The light source unit is a laser light source or an LED light source. For example, the laser light source is an RGB laser light source configured to emit red laser light, green laser light, and blue laser light. The driven mirror is, for example, a micro electro mechanical systems (MEMS) mirror, a digital micromirror device (DMD), a Galvano mirror, or a polygon mirror. The light-source drive circuit is configured to drive and control the light source unit. The light-source drive circuit is configured to generate a control signal for controlling operation of the light source unit based on a signal relating to a predetermined light pattern transmitted from the display control unit 43 and then transmit the control signal generated to the light source unit. The mirror drive circuit is configured to control and drive the driven mirror. The mirror drive circuit is configured to generate a control signal for controlling operation of the driven mirror based on a signal relating to a predetermined light pattern transmitted from the display control unit 43 and then transmit the control signal generated to the driven mirror. If the light source unit is an RGB laser light source, the road-surface projection device 45 can project a light pattern in various colors onto a road surface by scanning with laser light. For example, the light pattern may be an arrow-shaped light pattern indicating a traveling direction of the vehicle.

Projection by the road-surface projection device 45 may be by a raster scanning, digital light processing (DLP), or liquid crystal on silicon (LCOS). If DLP or LCOS is employed, the light source unit may be an LED light source. The projection by the road-surface projection device may be by LCD projection. If LCD projection is employed, the light source unit may be a plurality of LED light sources arranged in a matrix. The road-surface projection device 45 may be disposed in the lamp housing of each of the left headlamp and the right headlamp or on a vehicle body roof, a bumper, or a grille portion.

The HUD 42 is located inside the vehicle at least in part. Specifically, the HUD 42 is disposed in a predetermined location in the vehicle interior. For example, the HUD 42 may be disposed in a dashboard of the vehicle. The HUD 42 functions as a visual interface between the vehicle and an occupant. The HUD 42 is configured to display predetermined information (hereinafter, referred to as HUD information) to the occupant with the HUD information superimposed on the real world outside the vehicle (in particular, surroundings ahead of the vehicle). In this way, the HUD 42 functions as an augmented reality (AR) display. The HUD information, displayed by the HUD 42, is vehicle traveling information relating to traveling of the vehicle and/or surrounding information relating to surroundings of the vehicle (in particular, information relating to an object outside the vehicle).

Figure 2:
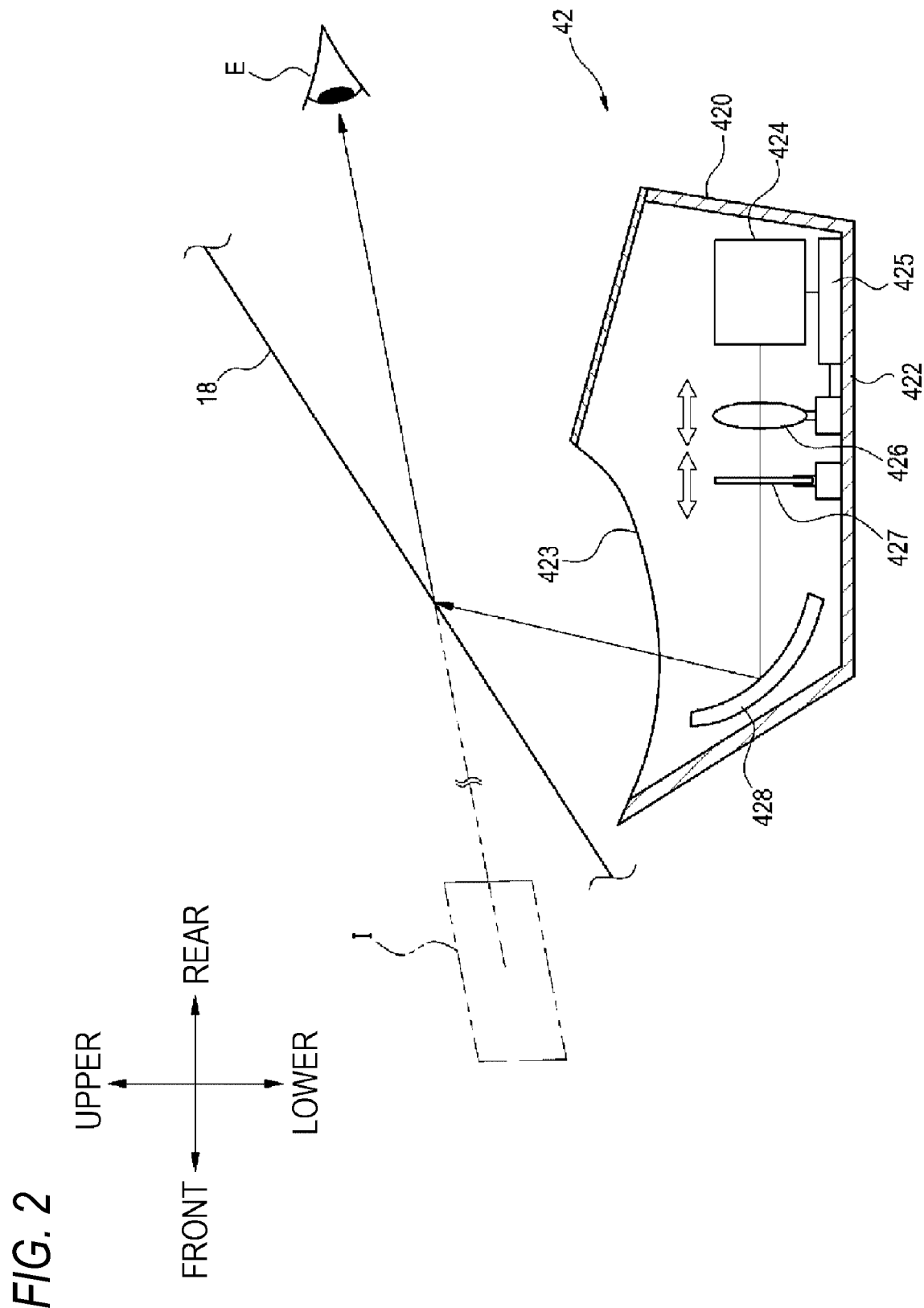
FIG. 2 is a schematic view of a head-up display (HUD) according to a present embodiment included in the vehicular display system.

As shown in FIG. 2, the HUD 42 includes a HUD body 420. The HUD body 420 includes a housing 422 and an emission window 423. The emission window 423 is a transparent plate transmitting visible light. Inside the housing 422, the HUD body 420 includes: a picture generation unit (PGU) 424; a control circuit board (example of a control unit) 425; a lens 426; a screen 427; and a concave mirror (example of a reflection unit) 428.

The picture generation unit 424 includes a light source, an optical component, and a display device. The light source is, for example, a laser light source or an LED light source. The laser light source is, for example, an RGB laser light source configured to emit red laser light, green laser light, and blue laser light. The optical component includes: a prism; a lens; a diffusion plate; a magnifying glass; and the like, as appropriate. The display device is a liquid crystal display, a digital micromirror device (DMD), or the like. Displaying by the picture generation unit 424 may be by raster scanning, DLP, or LCOS. If DLP or LCOS is employed, the light source of the HUD 42 may be an LED light source. If a liquid crystal display system is employed, the light source of the HUD 42 may be a white LED light source.

The control circuit board 425 is configured to control operation of the picture generation unit 424, the lens 426, and the screen 427. The control circuit board 425 includes: a processor such as a central processing unit (CPU); and a memory. The processor is configured to execute a computer program loaded from the memory to control operation of the picture generation unit 424, the lens 426, and the screen 427. The control circuit board 425 generates a control signal for controlling operation of the picture generation unit 424 based on image data transmitted from the display control unit 43 and then transmit the control signal generated to the picture generation unit 424. The control circuit board 425 is configured to generate control signals each for adjusting a position of the lens 426 or the screen 427 based on image data transmitted from the display control unit 43 and then transmit each of the control signals generated to the lens 426 and the screen 427. The control circuit board 425 may configured to control a direction of the concave mirror 428.

The lens 426 is disposed on an optical path of light emitted from the picture generation unit 424. The lens 426 includes, for example, a convex lens and is configured to project an image generated by the picture generation unit 424 onto the screen 427 in desired size. The lens 426 further includes a drive unit and is configured to be translated quickly to change a distance between the picture generation unit 424 and the lens 426 in response to a control signal generated by the control circuit board 425.

The screen 427 is disposed on the optical path of the light emitted from the picture generation unit 424. The light emitted from the picture generation unit 424 passes through the lens 426 and is then projected onto the screen 427. The screen 427 includes a drive unit and is configured to be translated quickly to change a distance between the picture generation unit 424 and the screen 427 and a distance between the lens 426 and the screen 427 in response to a control signal generated by the control board 425.

The picture generation unit 424 may contain the lens 426 and the screen 427. The lens 426 and the screen 427 may not be provided.

The concave mirror 428 is disposed on the optical path of the light emitted from the picture generation unit 424. The concave mirror 428 reflects, toward the windshield 18, the light emitted by the picture generation unit 424 and then passing through the lens 426 and the screen 427. The concave mirror 428 has a reflection surface curved in a concave shape to form a virtual image and reflects a light image formed on the screen 427 at a predetermined magnification.

Light emitted from the HUD body 420 heads toward the windshield 18 (for example, a front window of the vehicle 1). Next, some of the light emitted from the HUD body 420 to the windshield 18 is reflected toward the occupant's viewpoint E. As a result, the occupant perceives the light (predetermined image) emitted from the HUD body 420 to be a virtual image formed at a predetermined distance ahead of the windshield 18. Thus, the image displayed by the HUD 42 is superimposed on the real world ahead of the vehicle 1 through the windshield 18, so that the occupant can visually recognize that a virtual image object I formed by the predetermined image is floating on a road outside the vehicle.

A distance of the virtual image object I (distance between the occupant's viewpoint E and the virtual image) can be changed by adjusting the positions of the lens 426 and the screen 427, as appropriate. When a two-dimensional image is formed as the virtual image object I, the predetermined image is projected to be a virtual image at a arbitrarily determined single distance. When a three-dimensional image is formed as the virtual image object I, a plurality of predetermined images identical to or different from each other is projected to be virtual images at distances different from each other.

The display control unit 43 is configured to control operation of the road-surface projection device 45, the head lamp 20, and the HUD 42. The display control unit 43 is configured with an electronic control unit (ECU). The electronic control unit includes: a computer system (for example, a SoC) including one or more processors and one or more memories; and an electronic circuit including an active element such as a transistor and a passive element. The processor includes at least one of a CPU, an MPU, a GPU, and a TPU. The memory includes a ROM and a RAM. The computer system may be a non-Neumann computer such as an ASIC or an FPGA.

In the present embodiment, the vehicle control unit 3 and the display control unit 43 are separately provided but may be integrated. In this case, the display control unit 43 and the vehicle control unit 3 may be a single electronic control unit. The display control unit 43 may be configured with two electronic control units constituted of: an electronic control unit configured to control operation of the head lamp 20 and the road-surface projection device 45; and an electronic control unit configured to control operation of the HUD 42. The control board 425, configured to control the operation of the HUD 42, may be a part of the display control unit 43.

The sensor 5 includes at least one of an acceleration sensor, a speed sensor, and a gyroscope. The sensor 5 is configured to detect a traveling state of the vehicle to output traveling state information to the vehicle control unit 3. The sensor 5 may further include: a seat occupancy sensor configured to detect whether a driver sits in a driver seat; a face orientation sensor configured to detect an orientation of driver's face; an external weather sensor configured to detect external weather conditions, a human detection sensor configured to detect whether there is a person in the vehicle; and the like.

The camera 6 is, for example, a camera including an imager such as a charge-coupled device (CCD) or a complementary MOS (CMOS). The camera 6 includes one or more external cameras 6A and an internal camera 6B. The external cameras 6A are configured to acquire image data representing surroundings of the vehicle to transmit the image data to the vehicle control unit 3. The vehicle control unit 3 is configured to acquire surrounding information based on the image data transmitted. The surrounding information may include information relating to an object (a pedestrian, another vehicle, a sign, or the like) outside the vehicle. For example, the surrounding information may include: information relating to an attribute of the object outside the vehicle; and information relating to a distance and a relative position of the object to the vehicle. The external cameras 6A may be configured with monocular cameras or stereo cameras.

The internal camera 6B is disposed inside the vehicle and is configured to acquire image data indicating the occupant. The internal camera 6B functions as a tracking camera configured to track the occupant's viewpoint E. The occupant's viewpoint E may be either a viewpoint of the occupant's left eye or of the occupant's right eye. Alternatively, the viewpoint E may be defined as a midpoint of a line segment between the viewpoints of the left eye and the right eye. The display control unit 43 may determine the position of the occupant's viewpoint E based on the image data acquired by the internal camera 6B. The position of the occupant's viewpoint E may be updated at a predetermined cycle based on the image data or determined only once when the vehicle is activated.

The radar 7 includes at least one of a millimeter-wave radar, a microwave radar, and a laser radar (for example, a LiDAR unit). For example, the LiDAR unit is configured to detect surroundings of the vehicle. In particular, the LiDAR unit is configured to acquire three-dimensional mapping data (point cloud data) representing the surroundings of the vehicle to transmit the three-dimensional mapping data to the vehicle control unit 3. The vehicle control unit 3 is configured to determines the surrounding information based on the three-dimensional mapping data transmitted.

The HMI 8 includes: an input unit configured to receive input operation from the driver; and an output unit configured to output traveling information and the like to the driver. The input unit includes: a steering wheel; an accelerator pedal; a brake pedal; a driving mode switch for switching of driving mode of the vehicle; and the like. The output unit is a display (excluding the HUD) configured to display various types of traveling information. The GPS 9 is configured to acquire current position information of the vehicle to output the current position information acquired to the vehicle control unit 3.

The wireless communication unit 10 is configured to receive information (for example, traveling information) relating to another vehicle around the vehicle from that vehicle and to transmit information (for example, traveling information) on the vehicle to another vehicle (vehicle-to-vehicle communication). The wireless communication unit 10 is configured to receive infrastructure information from an infrastructure facility such as a traffic light and a traffic sign to transmit traveling information of the vehicle 1 to the infrastructure facility (vehicle-to-infrastructure communication). The wireless communication unit 10 is configured to receive information relating to a pedestrian from a portable electronic device (a smart phone, a tablet computer, a wearable device, or the like) carried by the pedestrian to transmit traveling information of the own vehicle to the portable electronic device (vehicle-to-pedestrian communication). The vehicle may communicate with another vehicle, the infrastructure facility, or the portable electronic device directly in ad-hoc mode or via an access point. The vehicle may also communicate with another vehicle, the infrastructure facility, or the portable electronic device via a communication network (not shown). The communication network includes at least one of the Internet, a local area network (LAN), a wide area network (WAN), and a radio access network (RAN). A wireless communication standard is, for example, Wi-Fi (registered trademark), Bluetooth (registered trademark), ZigBee (registered trademark), LPWA, DSRC (registered trademark), or Li-Fi. The vehicle 1 may communicate with another vehicle, the infrastructure facility, or the portable electronic device using the fifth generation mobile communication system (5G).

The storage device 11 is an external storage device such as a hard disk drive (HDD) and a solid-state drive (SSD). The storage device 11 may store two-dimensional or three-dimensional map information and/or a vehicle control program. For example, the three-dimensional map information may be three-dimensional mapping data (point cloud data). The storage device 11 is configured to output the map information and the vehicle control program to the vehicle control unit 3 in response to a request from the vehicle control unit 3. The map information and the vehicle control program may be updated via the wireless communication unit 10 and the communication network.

When the vehicle travels in the self-driving mode, the vehicle control unit 3 automatically generates at least one of a steering control signal, an accelerator control signal, and a brake control signal based on the traveling state information, the surrounding environment information, the current position information, the map information, and the like. The steering actuator 12 is configured to receive a steering control signal from the vehicle control unit 3 to control the steering device 13 based on the steering control signal received. The brake actuator 14 is configured to receive a brake control signal from the vehicle control unit 3 to control the brake device 15 based on the brake control signal received. The accelerator actuator 16 is configured to receive an accelerator control signal from the vehicle control unit 3 to control the accelerator device 17 based on the accelerator control signal received. In this way, the vehicle control unit 3 automatically controls traveling of the vehicle based on the traveling state information, the surrounding information, the current position information, the map information, and the like. That is, in the self-driving mode, traveling of the vehicle is automatically controlled by the vehicular system 2.

On the other hand, when the vehicle 1 travels in manual driving mode, the vehicle control unit 3 generates the steering control signal, the accelerator control signal, and the brake control signal according to driver's manual operation on the accelerator pedal, the brake pedal, and the steering wheel. In this way, in the manual driving mode, the steering control signal, the accelerator control signal, and the brake control signal are generated according to driver's manual operation, so that traveling of the vehicle is controlled by the driver.

Next, some driving mode of the vehicle will be described. The driving mode is the self-driving mode and the manual driving mode. The self-driving mode is constituted of full automation mode, advanced driver assistance mode, and driver assistance mode. In the full automation mode, the vehicular system 2 automatically performs all of steering control, brake control, and accelerator control so that the driver cannot drive the vehicle. In the advanced driver assistance mode, the vehicular system 2 automatically performs all of the steering control, the brake control, and the accelerator control so that the driver does not drive the vehicle but can drive the vehicle 1. In the driver assistance mode, the vehicular system 2 automatically performs some of the steering control, the brake control, and the accelerator control so that the driver drives the vehicle with driving assistance of the vehicular system 2. On the other hand, in the manual driving mode, the vehicular system 2 does not automatically perform traveling control so that the driver drives the vehicle without the driving assistance of the vehicular system 2.

In this way, the HUD 42 of the present embodiment is provided in the vehicle 1 and is configured to display a predetermined image to the occupant of the vehicle 1. The HUD 42 includes: the housing 422 having an opening upward; the emission window 423 (transparent cover) covering the opening of the housing 422; the picture generation unit 424 provided inside an image formation chamber (accommodation portion) formed with the housing 422 and the emission window 423 to emit light for generating a predetermined image; and the reflection unit 428 reflecting light so that light emitted by the picture generation unit 424 heads toward the windshield 18.

Figure 3:
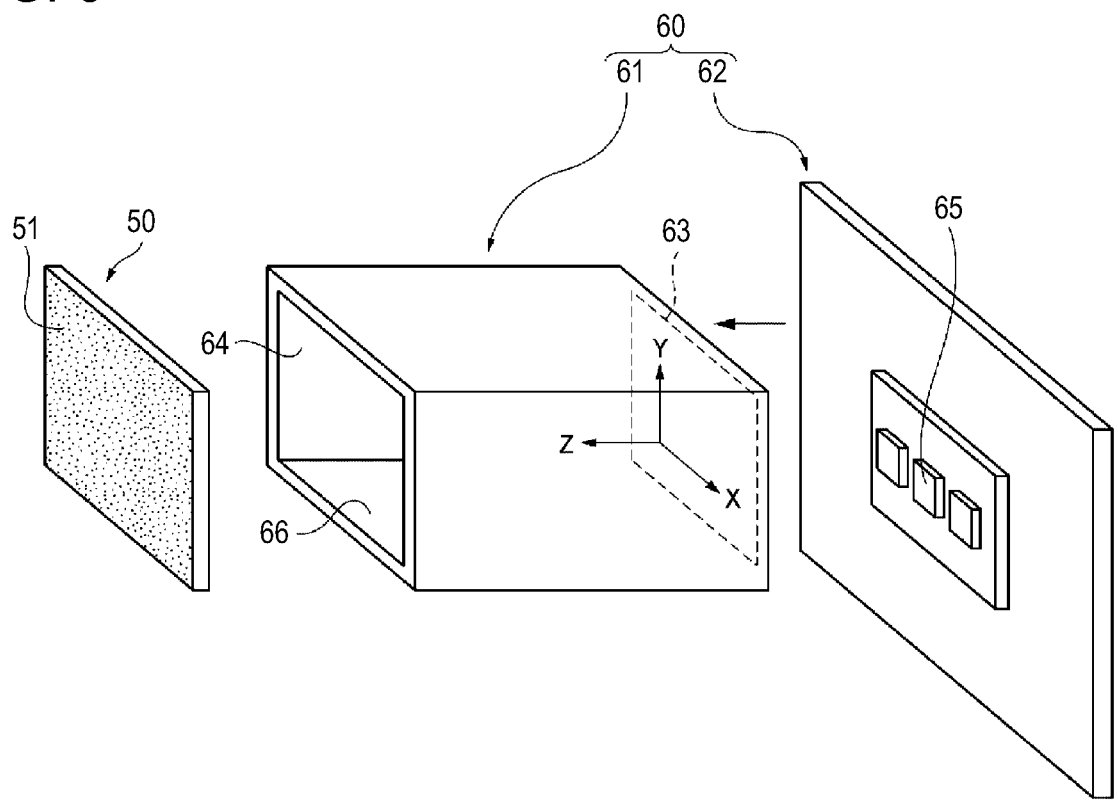
FIG. 3 is an exploded perspective view of a liquid crystal unit and a light source unit.

The picture generation unit 424 includes: a liquid crystal unit 50 and a light source unit 60 shown in FIG. 3. The liquid crystal unit 50 includes a plurality of liquid crystal elements 51 arranged in a matrix. Light emitted from the light source unit 60 passes through the liquid crystal elements 51, so that light forming a desired image is generated. The light source unit 60 is expected to emit a light beam having a uniform light intensity onto the plurality of liquid crystal elements 51 at a uniform incident angle. Such a light source unit 60 may be referred to as a rod integrator.

FIG. 3 is an exploded perspective view of the liquid crystal unit 50 and the light source unit 60. As shown in FIG. 3, the light source unit 60 includes: a multi-reflection member 61 and a substrate 62.

The multi-reflection member 61 shown in FIG. 3 is a prism member having a rectangular cross-section. An inner surface of the prism-shaped multi-reflection member 61 is a reflective surface. Both ends of the multi-reflection member 61 are open. One end of the multi-reflection member 61 is an entrance surface 63 and the other end is an emission surface 64. Light enters from the entrance surface 63 of the multi-reflective surface and is emitted from the emission surface 64. The multi-reflection member 61 and the liquid crystal unit 50 are so disposed that light emitted from the emission surface 64 enters the liquid crystal unit 50.

The substrate 62 faces the entrance surface 63 of the multi-reflection member 61. A plurality of LED elements 65 (light sources) is arranged on the substrate 62 in a matrix. On the substrate 62, LED elements 65 are arranged in a 1×3-matrix. As shown in FIG. 3, let an x-direction be a longer direction of the entrance surface 63, a y-direction a shorter direction of the entrance surface 63, and a z-direction a direction from the entrance surface 63 perpendicularly to the emission surface 64.

Figure 4:
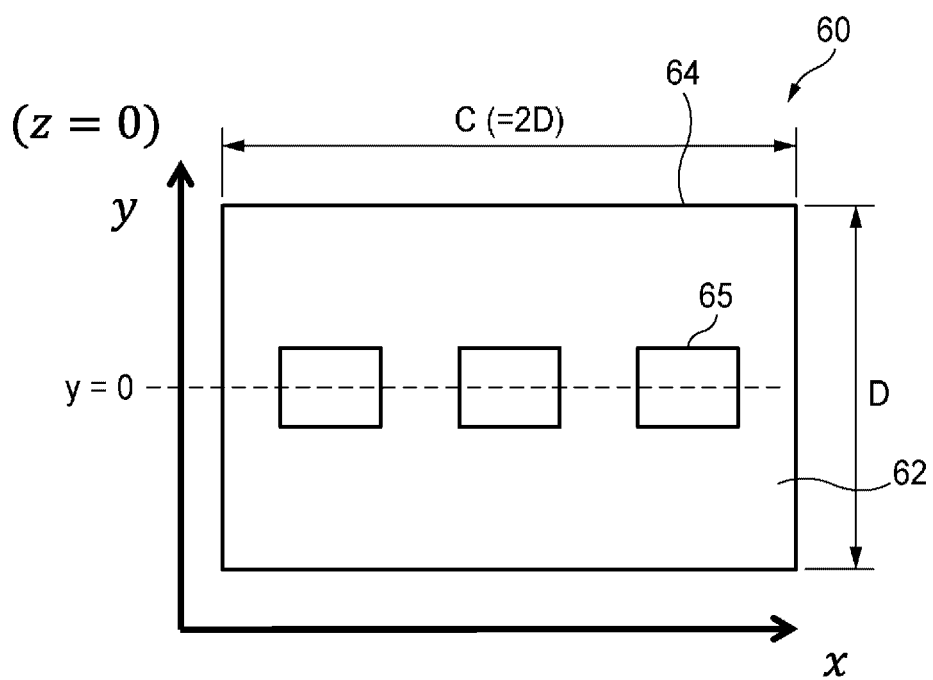
FIG. 4 shows LED elements provided on a substrate as viewed from a liquid crystal unit side.

FIG. 4 shows the LED elements 65, provided on the substrate 62, as viewed from a liquid crystal unit 50 side. FIG. 4 also shows an outer frame of the emission surface 64. Let A be the number of the LED elements 65 provided on the substrate 62 along the longer direction of the entrance surface 63 in FIG. 4. Let B be the number of the LED elements 65 provided on the substrate 62 along the shorter direction of the entrance surface 63. The longer direction of the entrance surface 63 is the x-direction in FIG. 4. The shorter direction of the entrance surface 63 is the y-direction in FIG. 4. A ratio Ra is defined as A/B. In FIG. 4, Ra=A/B=3/1=3.

Let C be a longer dimension and D a shorter dimension of the emission surface 64. A ratio Rb is defined as C/D. In FIG. 4, C is double D in length. For this reason, Rb=2/1=2. In this way, the ratio Ra is set to be larger than the ratio Rb.

Figure 5:
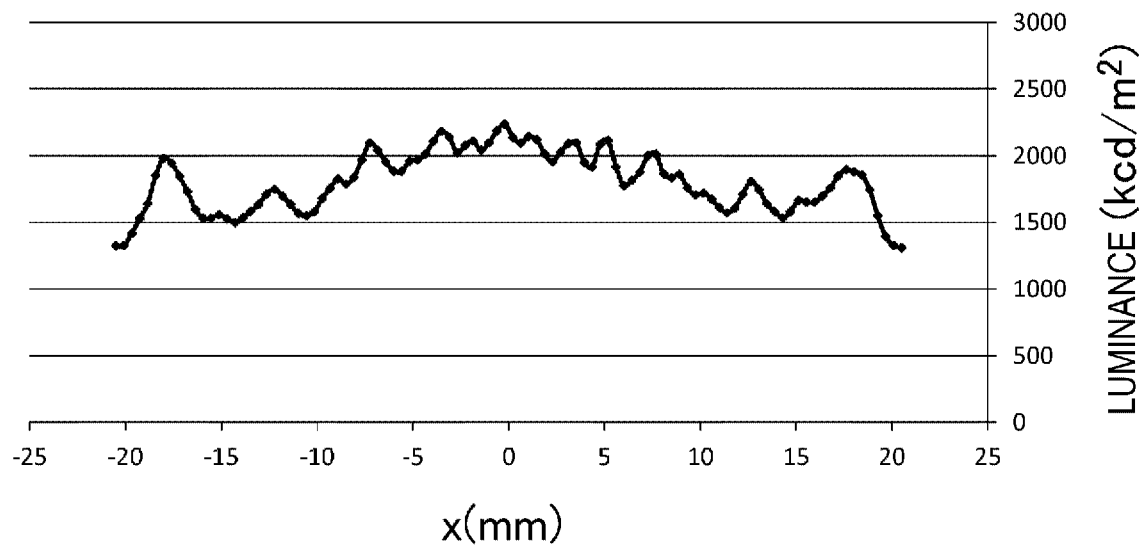
FIG. 5 shows a luminance distribution of light emitted from the light source unit on an emission surface.

FIG. 5 shows a luminance distribution of light emitted from the light source unit 60 configured as described above on the emission surface 34. FIG. 5 shows a luminance distribution in a line segment parallel to the x-direction at y=0 on the emission surface 64, where y=0 is a center of light-emitting surfaces of the LED elements 65 in the y-direction.

Figure 6:
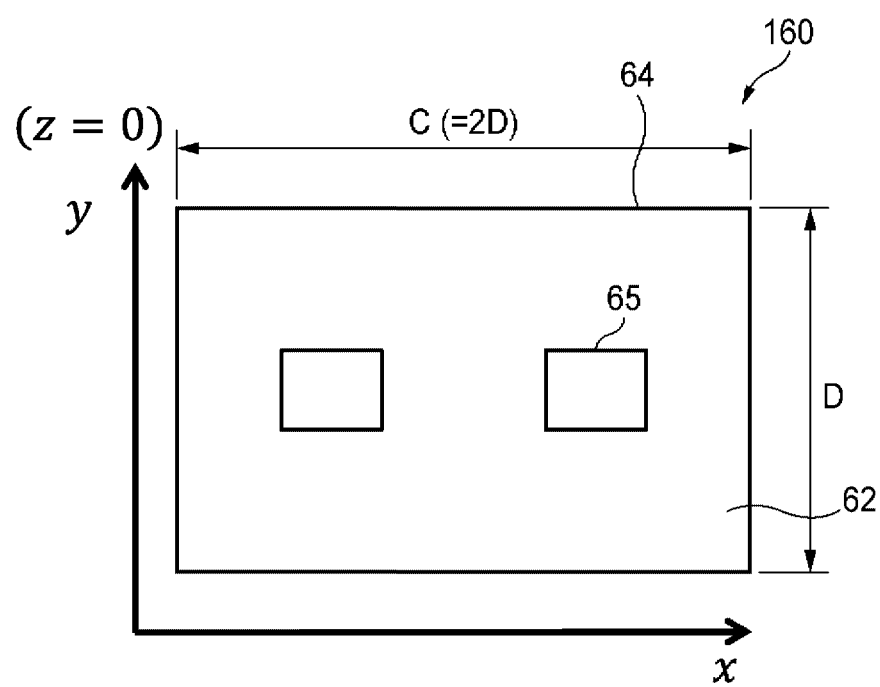
FIG. 6 is a view similar to FIG. 4 showing a light source unit according to a reference example.
Figure 7:
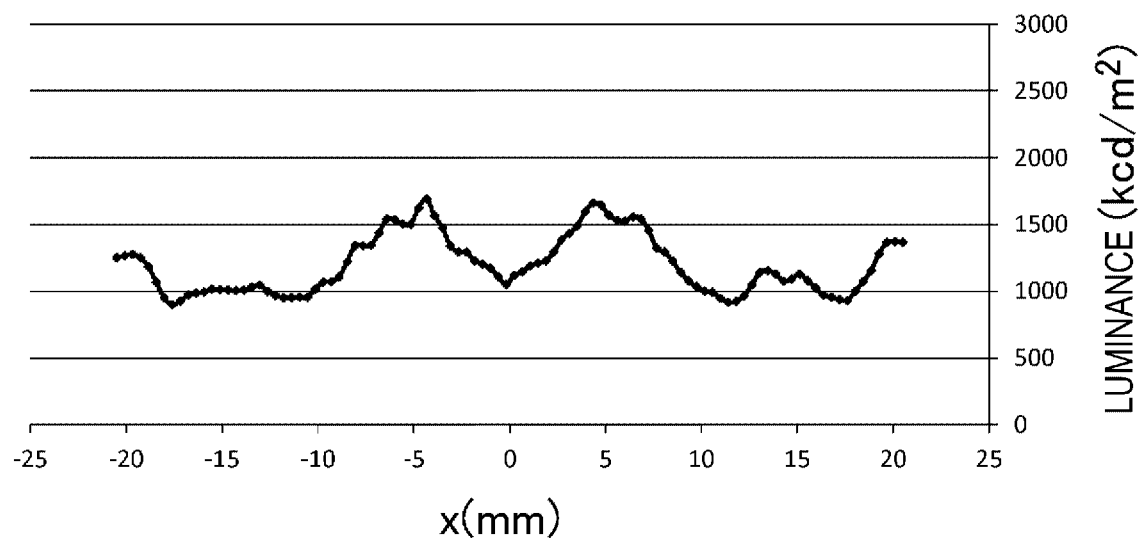
FIG. 7 is a view similar to FIG. 5 showing the light source unit according to the reference example.

The luminance distribution of the light source unit 60 according to the present embodiment will be compared with that of a light source unit 160 according to a reference example. FIG. 6 is a view similar to FIG. 4 showing the light source unit 160 according to the reference example. FIG. 7 is a view similar to FIG. 5 showing the light source unit 160 according to the reference example. As shown in FIG. 6, the light source unit 160 according to the reference example includes the same LED elements 65 and the substrate 62 as the light source unit 60 of the present embodiment, but the number of the LED elements 65 is two. For this reason, the ratio Ra (2/1=2) is equal to the ratio Rb (2/1=2). The luminance distribution on the emission surface 64 of the light source unit 160 according to the reference example is uneven as peaks can be confirmed, in FIG. 7, in positions corresponding to the LED elements 65 in the x-direction. In contrast, as shown in FIG. 5, the luminance distribution of the light source unit 60 according to the present embodiment is even in the x-direction.

Figure 8:
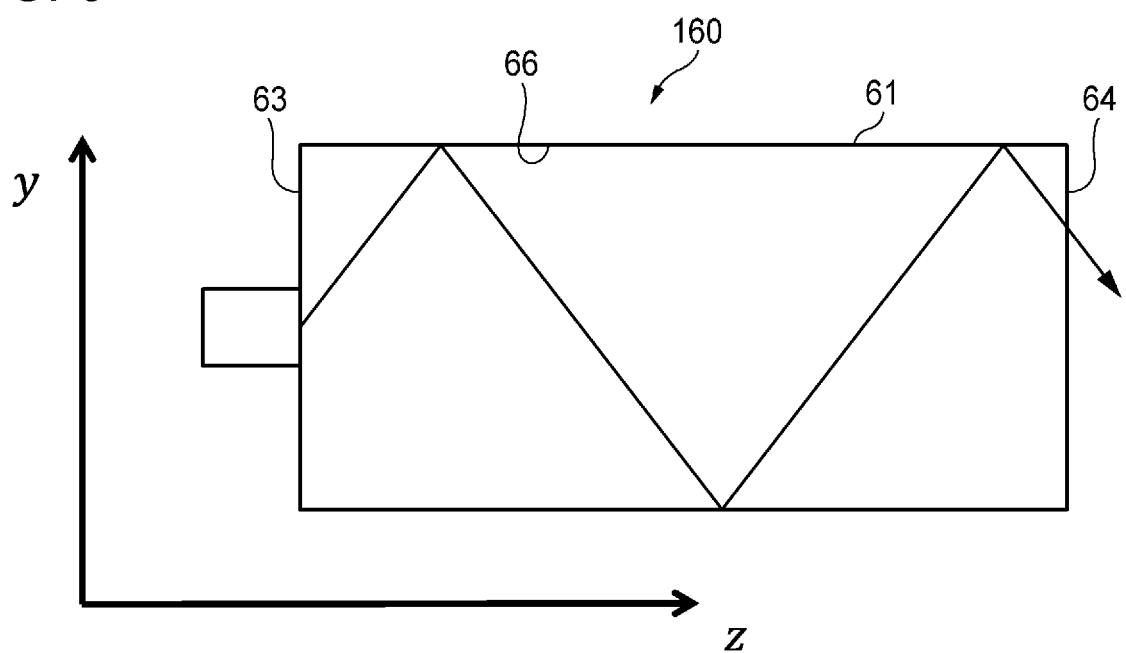
FIG. 8 shows a situation in which light emitted from an LED element in a shorter direction is reflected in the light source unit according to the reference example.
Figure 9:
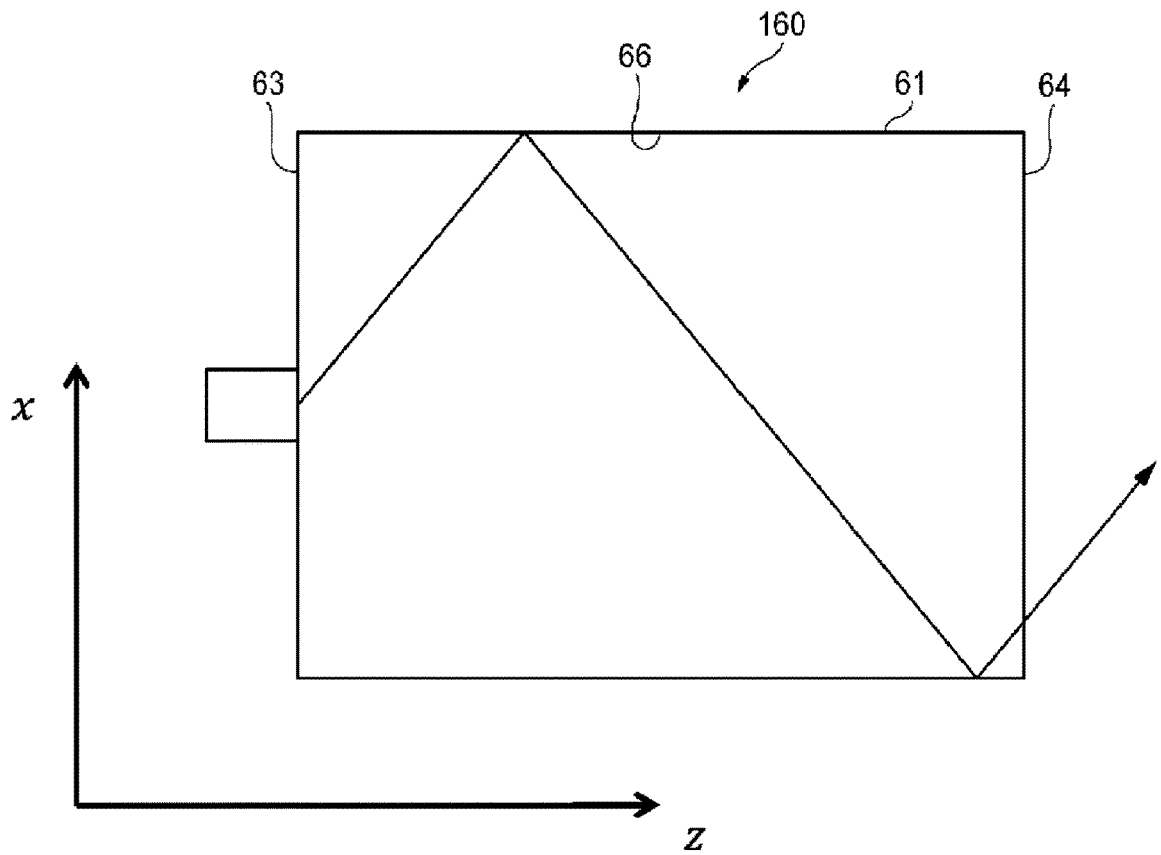
FIG. 9 shows a situation in which light emitted from a LED element in a longer direction is reflected in the light source unit according to the reference example.

A reason will be described with reference to FIGS. 8 and 9 why the luminance distribution of the light source unit 60 according to the present embodiment is less likely to be uneven. FIG. 8 shows a situation in which light emitted from the LED element 65 in the shorter direction is reflected in the light source unit 160 according to the reference example. FIG. 9 shows a situation in which light emitted from the LED element 65 in the longer direction is reflected in the light source unit 160 according to the reference example.

As shown in FIGS. 8 and 9, in the light source unit 160 according to the reference example, the number of times where the light emitted from the LED element 65 in the longer direction is reflected by the multi-reflection member 61 is smaller than the number of times where the light emitted from the LED element 65 in the shorter direction is reflected by the multi-reflection member 61.

Since the HUD 42 displays an image on a flat rectangular display unit such as the windshield 18 or a combiner, the liquid crystal elements 51 of the liquid crystal unit 50 form a rectangular matrix. Since the emission surface 64 of the multi-reflection member 61 also has a rectangular shape corresponding to the liquid crystal unit 50, the emission surface 64 of the multi-reflection member 61 has a longer side and a shorter side.

For this reason, if the ratio Ra is equal to or less than the ratio Rb as in the light source unit 160 according to the reference example, the number of times where light traveling in the longer direction is reflected by the multi-reflection member 61 is smaller than the number of times where the light traveling in the shorter direction is reflected by the multi-reflection member 61. As the number of times of reflection by the multi-reflection member 61 increases, light emitted from the LED element 65 has a more uniform luminance on the emission surface 64. For this reason, the luminance distribution of the light source unit 160 on the emission surface 64 according to the reference example is apt to be uneven in the longer direction.

In contrast, according to the light source unit 60 of the present embodiment, since the ratio Ra is larger than the ratio Rb, the number of times where light emitted from the LED element 65 to travel in the longer direction is reflected by the multi-reflection member 61 is equal to or larger than the number of times where light emitted from the LED element 65 to travel in the shorter direction is reflected by the multi-reflection member 61. For this reason, the luminance distribution of the light source unit 60 according to the present embodiment is less likely to be uneven in the longer direction, in which a luminance distribution is apt to be uneven. In the shorter direction, the number of times of reflections is apt to be large, so that a luminance distribution is less likely to uneven naturally. For this reason, in the light source unit 60 according to the present embodiment, the luminance distribution of light emitted from the emission surface 64 is even, so that the light source unit 60 is suitable for a light source unit configured to generate light entering the liquid crystal unit 50.

In the light source unit 60 according to the present embodiment, as shown in FIG. 4, it is preferable that the plurality of LED elements 65 be arranged at regular intervals to be mounted on the substrate 62. With such a configuration, light with less luminance unevenness is emitted.

Figure 10:
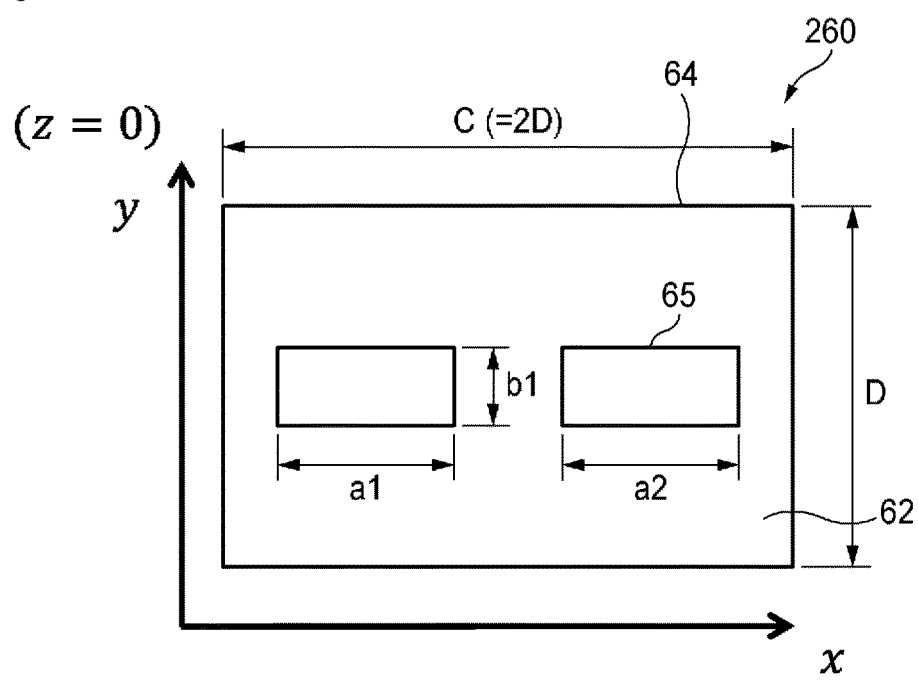
FIG. 10 is a view similar to FIG. 4 showing a light source unit according to a modification of the present invention.

Although the ratio Ra has been compared with the ratio Rb in the above described embodiment, the light source unit 60 may be configured in consideration of a ratio Rc=a/b, where a is the sum of lengths of the light-emitting surfaces of the plurality of LED elements 65 in the longer direction of the entrance surface 63 and b is the sum of lengths of the light-emitting surfaces of the plurality of LED elements 65 in the shorter direction of the entrance surface 63. In this case, if the ratio Rc is larger than the ratio Rb=C/D, where C is the longer dimension and D is the shorter dimension D of the emission surface 64, the light source unit 60 with less luminance unevenness in the longer direction can be obtained. FIG. 10 is a view similar to FIG. 4 showing a light source unit 260 according to a modification of the present invention.

In the modification, the light-emitting surfaces of the LED elements 65 are a rectangular shape. A length a1 of the light-emitting surface of the LED element 65 in the longer direction of the entrance surface 63 is three times a length b1 of the light-emitting surface of the LED element 65 in the shorter direction of the entrance surface 63. Light-emitting surfaces of the two LED elements 65 have the same shape. For this reason, the ratio Rc=3. On the other hand, the ratio Rb=2. For this reason, Rc>Rb. Also in the light source unit 260 configured as described above, the luminance distribution of light emitted from the emission surface 64 is even, so that the light source unit 260 according to the modification is suitable for a light source unit configured to generate light entering the liquid crystal unit 50.

If the length of the longer side or the shorter side of each LED element 65 are different, Rc is calculated in the same manner. For example, assuming that an n-th LED element has lengths an in the longer direction and bn in the shorter direction, Rc can be calculated as (a1+ . . . + an)/(b1+ . . . +bn).

Although the driving mode of the vehicle according to the above embodiments include: the full automation mode; the advanced driver assistance mode; the driver assistance mode; and the manual driving mode, the driving mode of the vehicle should not be limited thereto. The driving mode of the vehicle may include at least one thereof. For example, only one driving mode of the vehicle may be executable.

Further, a classification and a name of the driving mode of the vehicle may be changed according to laws or regulations concerning self-driving in each country, as appropriate. Similarly, definitions of the "full automation mode," the "advanced driver assistance mode," and the "driver assistance mode" in the descriptions of the present embodiments are merely examples and may be changed according to laws or regulations concerning self-driving in each country, as appropriate.

The present application is based on a Japanese patent application No. 2019-80996, filed on Apr. 22, 2019, and the contents thereof are incorporated herein by reference.

INDUSTRIAL APPLICABILITY

According to the present invention, there are provided a light source unit that can emit light having a more uniform luminance distribution and a head-up display using that light source unit.

REFERENCE SIGNS LIST 1 vehicle
18 windshield
50 liquid crystal unit
51 liquid crystal element
60, 160, 260 light source unit
61 multi-reflection member
62 substrate
63 entrance surface
64 emission surface
65 LED element
66 reflective surface
A the number of light sources provided in longer direction of entrance surface
B the number of light sources provided in shorter direction of entrance surface
a the sum of light-emitting surfaces of light sources in longer direction of entrance surface
b the sum of light-emitting surfaces of light sources in shorter direction of entrance surface
C longer dimension of emission surface
D shorter dimension of emission surface

The invention claimed is:

1. A light source unit used for a vehicular head-up display configured to display a predetermined image to an occupant of the vehicle comprising:
  a prism-shaped multi-reflection member that has:
    an entrance surface;
    a rectangular emission surface; and
    a reflective surface that connects the entrance surface and the rectangular emission surface and is provided on an inner surface of the multi-reflection member; and
  a substrate that faces the entrance surface and is provided with a plurality of light sources mounted in a matrix, wherein
  a ratio Ra=A/B is larger than a ratio Rb=C/D, where A is the number of the light sources provided in a longer direction of the entrance surface, B is the number of the light sources provided in a shorter direction of the entrance surface, C is a longer dimension of the rectangular emission surface, and D is a shorter dimension of the rectangular emission surface, or
  ratio Rc=a/b is larger than a ratio Rb=C/D, where a is the sum of lengths of light-emitting surfaces of the plurality of light sources in the longer direction of the entrance surface, b is the sum of lengths of the light-emitting surfaces of the plurality of light sources in the shorter direction of the entrance surface, C is the longer dimension of the rectangular emission surface, and D is the shorter dimension of the rectangular emission surface.

2. The light source unit according to claim 1, wherein the plurality of light sources is arranged at regular intervals to be mounted on the substrate.

3. A vehicular head-up display that is provided in a vehicle and is configured to display a predetermined image to an occupant of the vehicle comprising:
  a picture generation section comprising:
  a picture generation unit that is configured to emit light for generating the predetermined image; and
  a reflection unit that reflects light so that light emitted by the picture generation unit heads toward a windshield, wherein
  the picture generation unit further comprises:
  a liquid crystal element; and
  the light source unit according to claim 1.

\* \* \* \* \*